United States Patent [19]

Okude et al.

[11] Patent Number: 4,659,781

[45] Date of Patent: Apr. 21, 1987

[54] REACTIVE ACRYLIC OLIGOMER, GRAFTED ACRYLIC RESINOUS COMPOSITION BASED ON SAID OLIGOMER AND COATING COMPOSITION CONTAINING THE SAME

[75] Inventors: Yoshitaka Okude; Eiji Itoh, both of Osaka, Japan

[73] Assignee: Nippon Paint Co., Ltd., Osaka, Japan

[21] Appl. No.: 612,019

[22] Filed: May 18, 1984

[30] Foreign Application Priority Data

May 19, 1983 [JP] Japan .................................. 58-88960
May 19, 1983 [JP] Japan .................................. 58-88961
May 24, 1983 [JP] Japan .................................. 58-91930

[51] Int. Cl.$^4$ .................. C08F 271/02; C08F 291/12; C08F 265/04
[52] U.S. Cl. .................................... 525/279; 525/293; 525/301; 525/267; 525/910
[58] Field of Search ............... 525/286, 385, 910, 913, 525/293, 279, 267, 301

[56] References Cited

U.S. PATENT DOCUMENTS

| | | | |
|---|---|---|---|
| 3,285,949 | 11/1966 | Siebert ................................. | 525/84 |
| 3,390,206 | 6/1968 | Thompson et al. .................. | 260/875 |
| 3,514,500 | 5/1970 | Osmond et al. ..................... | 260/874 |
| 4,013,710 | 3/1977 | Skillicorn ........................ | 525/379 X |
| 4,085,168 | 4/1978 | Milkovich et al. ................. | 525/385 |
| 4,554,324 | 11/1985 | Husman et al. ..................... | 525/301 |

FOREIGN PATENT DOCUMENTS 0104046 3/1984 European Pat. Off. .

*Primary Examiner*—Carman J. Seccuro
*Attorney, Agent, or Firm*—Wenderoth, Lind & Ponack

[57] ABSTRACT

The present invention provides a reactive acrylic oligomer obtained by the method of polymerizing at least one $\alpha, \beta$-ethylenically unsaturated monomers having no oxirane ring and/or carboxyl groups, in an organic solvent and in the presence of azo initiator having carboxyl group and tertiary amine, and then reacting the same with a compound having $\alpha, \beta$-ethylenically unsaturated bonding and oxirane ring. The invention further provides a grafted acrylic resinous composition obtained by the method of copolymerizing said reactive acrylic oligomer with at least one $\alpha, \beta$-ethylenically unsaturated monomers which will constitute the backbone of the graft polymer, as well as the coating composition containing as resinous vehicle the abovesaid resinous composition and especially the resinous composition whose graft polymer is an amphoteric acrylic resin having backbone chain with acidic groups and branched chains with concentrated quantity of basic groups.

3 Claims, No Drawings

REACTIVE ACRYLIC OLIGOMER, GRAFTED ACRYLIC RESINOUS COMPOSITION BASED ON SAID OLIGOMER AND COATING COMPOSITION CONTAINING THE SAME

FIELD OF INVENTION

The present invention relates to a reactive acrylic oligomer which is useful for the preparation of grafted acrylic resin. The invention also concerns a grafted acrylic resinous composition and coating composition containg the same.

BACKGROUND OF THE INVENTION

In the preparation of acrylic graft polymer, an organic solution of oligomer having at the end portion thereof a reactive $\alpha,\beta$-ethylenically unsaturated bonding is very useful as is well known in the art. Heretofore, such reactive acrylic oligomers, i.e. the so-called macromer solution, have been prepared by the method wherein an end carboxyl bearing oligomer is first prepared from $\alpha,\beta$-ethylenically unsaturated monomer(s) using both initiator and chain transfer agent like thioglycolic acid and the oligomer is then reacted with glycidyl (meth)acrylate (see Brit. Pat. No. 1,096,912) or the method wherein an oligomer having end hydroxyl group is first prepared by using initiator and mercaptoethanol and after reacting with tolylene diisocyanate, thus obtained product is subjected to macromerization with 2-hydroxy ethyl methacrylate or the like (see U.S. Pat. No. 3,689,593). However, in these methods, since an initiator and a chain transfer agent are always present in the reaction system, when effected a polymerization to a higher reaction degree, thus formed macromer do necessarily contain C—S—C bonding coming from the chain transfer agent used and said bonding is insufficient in light stability and will cause the degradation of the polymer when exposed to sun light. In the case of styrene or the like, has also been known a method wherein the monomers are first polymerized by ionic polymerization technique, and the product is, after reacting with ethylene oxide, processed by acrylic halide. However, in such an ionic polymerization, the employable monomers are limited and hence the method cannot be said to be a generic one.

The inventors, having made endeavor to find out an optimum method for the preparation of organic solution of reactive acrylic oligomer which is free from the question of light stability and is useful for the subsequent graft polymerization, the method being quite easy for the control of molecular weight of the oligomer and applicable to a wide range of monomeric materials, have found that polymerization of reactive monomers having no oxirane ring and carboxyl group in an organic solvent and in the presence of azo initiator having carboxyl group and tertiary amine will give in a higher polymerization rate and very effectively a solution of end carboxyl bearing acrylic oligomer, which is easily converted to a reactive acrylic oligomer. The inventors also have found that an acrylic graft polymer may be easily prepared by effecting copolymerization of at least one $\alpha,\beta$-ethylenically unsaturated monomer and said reactive acrylic oligomer and that side (or branched) chain- and main (or backbone) chain-constituting monomers of graft polymer may be freely controlled in kind and certain amphoteric resins thus obtained are quite useful as resinous vehicle for coating use.

On the basis of these findings, the invention had been made.

That is, in the first aspect of the invention, is provided a reactive acrylic oligomer solution obtained by the method wherein at least one $\alpha,\beta$-ethylenically unsaturated monomer(s) having no oxirane ring and/or carboxyl group is (are) polymerized in an organic solvent and in the presence of azo initiator having carboxyl group and tertiary amine and thus obtained product is then reacted with a compound having both $\alpha,\beta$-ethylenically unsaturated bondinag and oxirane ring.

As is clear from the foregoing, the present acrylic oligomer denotes a comparatively lower molecular weight polymer having a mean molecular weight of less than about 20,000.

The $\alpha,\beta$-ethylenically unsaturated monomer having no oxirane and/or carboxyl group used in the preparation of the present polymer composition may be any of the compounds having no functional groups abovementioned, which are known as monomers for the conventional acrylic or vinyl polymers.

Examples of such monomers are:

(1) Non-functional monomers as acrylates (e.g. methyl acrylate, ethyl acrylate, isopropyl acrylate, n-butyl acrylate, isobutyl acrylate, t-butyl acrylate, 2-ethylhexyl acrylate, cyclohexyl acrylate, benzyl acrylate, n-octyl acrylate, dodecyl acrylate and the like); corresponding methacrylates; fatty acid vinyl esters (e.g. vinyl acetate, vinyl propionate, vinyl butyrate, vinyl stearate and the like); and aromatic monoolefins (e.g. styrene, chorostyrene, $\alpha$-methyl styrene, vinyl toluene and the like).

(2) Functional monomers as hydroxyalkyl acrylates (e.g. 2-hydroxyethyl acrylate, 2-hydroxypropyl acrylate, 3-hydroxypropyl acrylate, 4-hydroxybutyl acrylate and the like); corresponding methacrylates; aminoalkyl(meth)acrylates represented by the formula:

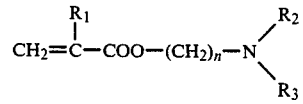

(wherein $R_1$ is hydrogen or methyl group, $R_2$ and $R_3$ each represents $C_1 \sim C_6$ alkyl and n is an integer of 1 to 6); vinyl pyridines (4-vinyl pyridine, 2-vinyl pyridine, 2-methyl-5-vinyl pyridine and the like): N,N-disubstituted acrylamides and methacrylamides; N-methylol(meth)acrylamides N,N-dimethylol(meth)acrylamides; acrylonitrile and methacrylonitirile.

The carboxy bearing azo initiator used in the present invention may be any of the known azo initiators having carboxyl groups as, for example, 4,4'-azobis(4-cyanovaleric acid), 7,7'-azobis(7-cyanocaprylic-acid), 6,6'-azobis(6-cyano-6-cyclohexylcaproic acid), 2,2'-azobis-(2-methylpropionic acid), 2,2'-azobis(2-ethyl-4-methoxy valeric acid), 2,2'-azobis(2-benzylpropionic acid) and the like. As the tertiary amine, use is made of any of the known members including pyridine, isoquinoline, quinoline, N,N-dimethylcyclohexylamine, $\alpha$-picoline, benzyldimethyl amine, tri-n-butylamine, triethylamine, N-ethyl morpholine, N,N-dimethylaniline, N-ethyl-3,5-dimethyl morpholine, and the like.

In the present invention, at least one of the abovementioned ethylenically unsaturated monomers is (are) polymerized in an organic solvent and in the presence of the abovesaid carboxyl bearing azo initiator and tertiary amine to give end carboxyl bearing acrylic oligomer.

As the organic solvent, any of the following may be satisfactorily used: alcohols as ethanol, propanol, isopropanol, butanol, ethyl Cellosolve, methyl Cellosolve, and the like; cyclic ethers as dioxane and the like; ketones as methyl ethyl ketone, methyl isobutyl ketone, methyl amyl ketone, cyclohexanone and the like; esters as ethyl acetate, propyl acetate, butyl acetate, amyl acetate, 2-ethoxyethyl acetate, 2-methoxyethyl acetate, and the like; hydrocarbons as toluene, xylene, Solvesso 100 (registered trade mark of Esso), Solvesso 150 (Esso) and the like, and mixtures thereof.

The reaction may be carried out with 0.5 to 40 parts, preferably 1 to 25 parts (parts by weight, hereinafter the same), of carboxy bearing azo initiator and 100 parts of monomers to be polymerized, in the presence of tertiary amine in a quantity which is sufficient enough to neutralize almost all of the carboxyl groups of said azo initiator, under heating condition. In practice, the ratio of acid equivalent/amine equivalent is selected in a range of 1/0.5 to 1/2, preferably 1/0.8 ato 1/1.5.

It is generally sufficient enough to use the condition of heating at 60° to 150° C., preferably 80° to 130° C. for several hours, but these conditions may be changed depend on reactants, aimed object and the like. By the adoption of abovesaid reaction, is obtained a solution of end carboxyl bearing acrylic oligomer.

Polymerization of α,β ethylenically unsaturated monomers in an organic solvent using carboxyl bearing azo initiator like azobiscyano valeric acid had been known. However, in that method, since a limited quantity, e.g. only 0.2 to 0.3% of the total monomers, of initiator was used because of its poor solubility, polymerization rate was quite low and it was unable to obtain a comparatively low molecular oligomer with a mean value of about 600 to 20,000. An attempt had once been made to use a particular organic solvent like dimethylsulfoxide to increase the initiator concentration in the system, but the resulted product had never been used as resinous varnish in coating area because of untolerable odor of the solvent used.

To compensate the above, use had been made of chain transfer agent and however, troubles had been encountered in the employment of such agent as already stated hereinbefore.

Nevertheless, as in the present invention, co-use of tertiary amine and azo initiator can increase remarkably the initiator's concentration and can afford quite easily an acrylic oligomer having desired molecular weight range without the nessecity of using a chain transfer agent. Moreover, since the used initiator always presents in the end portion of said acrylic oligomer, the resulted product is an end carboxyl bearing oligomer.

For the only purpose of converting the azo initiator used to its organic solvent soluble type, any of the primary, secondary or tertiary amines may be successfully used and in fact, end carboxyl bearing acrylic oligomers may be obtained therewith. However, in the present invention, thus obtained oligomer is subsequently reacted with a compound having both oxirane ring and polymerizable unsaturated bonding, as, for example, compounds represented by the formula:

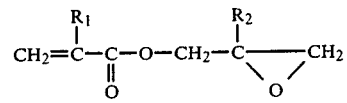

(wherein $R_1$ and $R_2$ each represents hydrogen or methyl group) and ester bonding is formed by the reaction of said carboxyl group and oxirane portion. At that time, when the employed amine is of primary or secondary nature, there always occurs undesirable side-reactions and will interfere with the abovesaid reaction.

On the other hand, tertiary amine can never affect on the said reaction and moreover, give favorable effect, i.e. catalytic or accelerating effect, on the same. Therefore, in the present invention, tertiary amine is selectively used for the neutralization of said zo initiator.

However, in less preferred embodiment, primary or secondary amine may be used in place of tertiary amine in the preparation of said end carboxyl bearing acrylic oligomer, and after replacing the amine with tertiary amine, the product is then reacted with a compound having both oxirane ring and polymerizable unsaturated bonding. Therefore, it is to be understood that the present invention involves such embodiments as a matter of fact.

Though it is not essential in the invention, the abovesaid second step may preferably be carried out in the presence of common polymerization inhibitor as, for example, hydroquinone, hydroquinone monomethylether and the like to secure the holding of reactive unsaturated bonding in the product.

As already stated, since tertiary amine may act the role of catalyst, there is no need of adding an external catalyst, but if desired, such metal salt as stannous octoate, zinc acetate and the like may be added as a separate catalyst.

In general, the abovesaid second step may be advantageously carried out under heating and the temperature is determined in a range of 50° to 170° C., preferably 80° at 150° C.

As is clear from the foregoing, since a wide variety of α,β-ethylenically unsaturated monomers having no oxirane ring and carboxyl group can be freely used, it is quite easy to concentrate particular functional groups as hydroxyl, amino or the like in the oligomer portion or to control the amounts of such groups in the product as desired.

Furthermore, the molecular weight of the oligomer may be easily controlled by the selection of appropriate initiator concentration, reaction temperature and the like.

Thus, in the present invention, the so-called tailor-made, reactive acrylic oligomer may be freely obtained in the form of organic solvent solution. Therefore, the reaction product may be directly used for the preparation of graft polymer as it is. The present macromer may be copolymerized with one or more of other polymerizable monomers, whereby improving or modifying properties of acrylic resins. For example, in the case of hydrophobic polymer grafted with hydrophilic group bearing side chains, e.g. the backbone being composed of hydroxyethyl methacrylate and the branched chains being composed of methyl methacrylate, thus obtained polymer may provide hydrophilic or hydrophobic surface depending on the environmental conditions to be placed in, and the hydrophilic surface may be useful for the improvements in wetting, adhesion, printing or the like, whereas the hydrophobic surface in water repellency, stain resistance or the like. Thus, in the second aspect of the invention, is provided a grafted acrylic resinous composition obtained by the combination of steps of polymerizing at least one $\alpha,\beta$-ethylenically unsaturated monomer(s) having no oxirane ring and/or carboxyl group, in an organic solvent and in the presence of azo initiator and tertiary amine to obtain an acrylic oligomer having end carboxyl groups, reacting the latter with a compound having both $\alpha,\beta$-ethylenically unsaturated bonding and oxirane ring to obtain a solution of reactive acrylic oligomer and copolymerizing the same with at least one $\alpha,\beta$-ethylenically unsaturated monomers that will constitute the backbone through radical polymerization thereof.

The third radical polymerization step may be carried out by using conventional means, i.e. with the the help of initiator, chain transfer agent or the like.

According to the invention, it is possible to design and control the kind and amounts of graft chain constituting monomers, molecular weight of the chain, as well as the kind and amounts of backbone constituting monomers and molecular weight thereof and prepare the tailor-made graft polymer.

In coating area, there is always demand for having resinous compositions with improved pigment dispersibility.

Since the pigments used in coating area are of various natures including acidic, neutral and basic properties, attempts had been made to use an amphoteric type resin as disclosed in Japanese Patent Application Kokai No. 21468/83.

As a method for giving basic property to an acidic polymer like acrylic resin, is customarily adopted a random copolymerization with basic monomer, as well as the materials for said resin. However, in that method, the basic groups are widely distributed in the backbone chain. Therefore, in the combination of such resin and acidic pigment, the resin is believed to be adsorbed on the pigment particles in the form that molecular distance between the basic groups will get short and hence the adsorption layer will get thin. Thus, a satisfactory dispersion stability cannot be expected and in fact, continuing demands are always pointed in the pigment dispersion pastes with such combination in respect of time stability thereof. Furthermore, since the basic groups are located at very close positions to the polymer backbone, the so-called steric hindrance and other troubles are always occured and hence certain improvements are desired in respect of adsorption efficiency and dispersion rate.

Pigment dispersion stability and storage stability of a coating composition would be greatly improved if the employed amphoteric resin can be effectively adsorbed on pigment particles and a thicker adsorption layer can be formed on and around said particles.

In the present invention, the kind and natures of monomeric materials constituting both branched and backbone chains in graft polymer may be freely controlled and designed at will. For example, by selecting basic monomer as a part of said $\alpha,\beta$-ethylenically unsaturated monomers used in the preparation of macromer and acidic monomer as a part of monomeric materials used in the preparation of backbone chain, a grafted amphoteric resin whose basic groups are concentrated or extremely one-sided in the grafted chains may be obtained. And, as will be clear, one may freely design and control the molecular weight of both branched and backbone chains, and degree of concentration of said basic groups in the grafted polymer.

The inventors have surprisingly found that excellent coating composition in respect of pigment dispersion stability and inter alia, time stability can be provided with the acrylic graft copolymer obtained by the present macromer method, having the branched chains that are riched in basic groups. Thus, in the third aspect of the invention, is provided a coating composition comprising an acrylic graft copolymer having backbone chain and grafted chains at least 30% of whose constituting monomers are basic monomer, in an amount corresponding to at least 5% of the resinous component.

The composition is characterized by having a far improved pigment dispersion stability and especially for acidic pigment.

As the basic monomer to be used as a constituting member of graft chain, any of the basic monomers customarily used in the preparation of acrylic or vinyl resins may be satisfactorily used. Examples of such members are acrylates as dimethylaminomethyl acrylate, diethylaminomethyl acrylate, dibutyl aminomethyl acrylate, dihexylaminomethyl acrylate, dimethylaminoethyl acrylate, diethylaminoethyl acrylate, di(t-butyl)aminoethylacrylate, diisohexylaminoethyl acrylate, dihexylaminopropyl acrylate, di(t-butyl)aminohexyl acrylate and the like; corresponding methacrylates; vinyl pyridines as 4-vinyl pyridine, 2-vinyl pyridine, 2-methyl-5-vinyl pyridine and the like.

Graft chain constituting monomers may be composed of such basic monomers alone or combination with other monomers, but in the present invention, it is essential that at least 30% of the required monomers be composed of said basic ones. When the content of basic monomers in the graft chain is less than 30%, it is unable to attain the object of having a coatinag composition with excellent pigment dispersibility because of insufficient pigment adsorbability thereof.

Backbone chain constituting monomers may be any of $\alpha,\beta$-ethylenically unsaturated monomers customarily used in the preparation of acrylic polymer, including the abovementioned basic monomers. However, in order to obtain an amphoteric resin, a part of said backbone chain constituting monomers should be an acidic monomer, e.g. polymerizable unsaturated monomer having carboxyl groups. Examples of such acidic monomers are acrylic acid, methacrylic acid, maleic anhydride, maleic acid, fumaric acid, itaconic acid, crotonic acid and the like. This invention can never be limited to the said acidic monomers, and any of the compounds having both polymerizable unsaturated bonding and acidic group may be satisfactorily used.

Beside the amphoteric nature of the graft resin, it is preferred for the purpose of obtaining a coating composition compounded with, for example, an amino resin or hardening agent, that the acidic monomer content in the backbone chain of the present graft copolymer should be in a range which is sufficient enough to give a resinous acid value of 5~50. It has also been found that the backbone chain constituting monomers should preferably conatain hydroxyl bearing monomer so as to give a hydroxyl number of the final resin (in terms of solid matter) of 40~150.

In the present invention, the abovesaid acrylic graft copolymer should constitute at least 5% of the resinous components of the resinous vehicle of the coating composition. Thus, the said copolymer may be advantageously used, in singularly or in the combination form with other resin, for the pigment dispersion purpose of the present coating composition.

The present coating composition may further include solvent, pigment and other optional resinous materials and additives for coating use. In preparing the coating composition, no specific means and techniques are required and hence detailed explanations would not be necessitated in this regards. However, in a preferred embodiment, pigment is first dispersed in the present resinous composition to obtain a dispersion paste, which is then compounded with other film-forming resin and other optional additives. It is of course possible to make the pigment dispersion paste with other resinous material than the graft copolymer and at the later stage, added a required quantity of the present graft copolymer. In any case, in the present invention, the said graft copolymer should constitute at least 5% of the resinous component for the purpose of obtaining a coating composition with excellent pigment dispersion stability and time stability. Since the abovesaid graft copolymer is a kind of amphoteric resin, it is excellent in compatibility with other resin, which is also one of the characteristic features of the coating composition.

The invention shall be now more fully explained in the following Examples. Unless otherwise being stated, all parts and % are by weight.

EXAMPLE 1

Into a reaction vessel fitted with dropping funnels A and B, condenser, nitrogen gas inlet pipe, thermometer and stirrer, were placed 400 parts of butyl acetate and 400 parts of xylene and the mixture was heated to 120° C. The dropping funnel A was charged with 100 parts of styrene monomer and 100 parts of 2-ethylhexyl methacrylate, and the dropping funnel B with a mixed solution of 45 parts of 4,4'-azobis(4-cyanovaleric acid), 180 parts of butanol and 33 parts of triethyl amine. Under nitrogen atmosphere, the contents of said dropping funnels were dropwise and simultaneously added at 120° C. to the reaction vessel over 3 hours. After completion of said dropping, the mixture was maintained at 120° C. for 30 minutes and thereafter, the solvents were distilled off at 120° C. under reduced pressure to obtain 240 parts of end carboxyl bearing acrylic oligomer. Next, 240 parts of xylene were added to and diluted the oligomer solution, to this were added 27.0 parts of glycidyl methacrylate and 0.5 part of hydroquinone and the mixture was heated to 140° C. and then maintained at 150° C. for 90 min. to complete the addition reaction. A pale yellow macromer solution was obtained, whose characteristics are shown in Table 3.

EXAMPLES 2~5

Following the procedures of Example 1 but using the materials shown in Table 1, similar macromer solutions were prepared. The characteristics are shown in Table 3.

TABLE 1

|  | Example | | | |
|---|---|---|---|---|
|  | 2 | 3 | 4 | 5 |
| styrene | 100 | 100 | | |
| methyl methacrylate | | | 100 | 100 |
| 2-ethylhexyl-methacrylate | 100 | 100 | | |
| 2-hydroxyethyl-acrylate | | | 100 | 100 |
| xylene | 300 | 300 | 300 | 300 |
| butyl acetate | 300 | 300 | 300 | 300 |
| 4,4'-azobis (4-cyanovaleric acid) | 30 | 15 | 30 | 12 |
| butanol | 120 | 60 | 120 | 60 |
| triethylamine | 22 | 11 | 22 | 8.8 |
| dilution xylene | 230 | 214 | 230 | 210 |
| glycidyl methacrylate | 18 | 9 | 18 | 7 |
| Hydroquinone | 0.5 | 0.5 | 0.5 | 0.5 |

EXAMPLE 6

Into the similar reaction vessel as used in Example 1, were placed 800 parts of butyl acetate and heated to 115° C. To this, were dropwise and simultaneously added a mixture of 143 parts of styrene and 57 parts of 2-ethylhexyl acrylate from a dropping funnel A and a mixture of 50 parts of 7,7'-azobis(7-cyanocaprilic acid), 200 parts of n-butanol and 41 parts of benzyldimethylamine from other dropping funnel B, under nitrogen atmosphere, at 115° C. over 3 hours. After completion of said addition, the reaction mixture was maintained at 115° C. for 30 minutes and thereafter, added with 39 parts of glycidyl methacrylate and 0.5 part of hydroquinone monomethyl ether and maintained at the same temperature for 120 minutes to complete the addition reaction. 100 Parts of xylene were added and the mixture was allowed to cool to obtain a macromer solution. The characteristics are shown in Table 3.

EXAMPLES 7~13

Using the same procedure as stated in Example 6 but with the materials given in Table 2, macromer solutions were prepared. The characteristics are shown in Table 3.

TABLE 2

| Example | 7 | 8 | 9 | 10 | 11 | 12 | 13 |
|---|---|---|---|---|---|---|---|
| styrene | 100 | | 100 | | | | |
| methyl methacrylate | | | 100 | | | 100 | 100 |
| 2-ethylhexyl methacrylate | 75 | | | | | | |
| 2-ethylhexyl acrylate | | 100 | | | | | |
| lauryl methacrylate | 25 | 100 | | | | | |
| 2-hydroxyethyl methacrylate | | | | 50 | | | |
| 2-hydroxyethyl acrylate | | | | 150 | | | |
| dimethylaminoethyl methacrylate | | | | | 200 | 100 | 100 |
| xylene | 400 | 200 | 400 | | | | |
| butyl acetate | 400 | 600 | 400 | 400 | 800 | 800 | 500 |
| butanol | | | | 400 | | | |
| 4,4'-azobis(4-cyanovaleric acid) | | 45 | 35 | 50 | 50 | 35 | 3.5 |
| 7,7'-azobis(7-cyanoprilic acid) | 40 | | | | | | |
| triethylamine | | | 25 | 36 | 36 | 25 | 2.5 |
| diethylbenzylamine | 33 | 37 | | | | | |
| n-butanol | 160 | 180 | 140 | 200 | 200 | 140 | 14 |
| glycidyl methacrylate | 31.2 | | | | | | |

TABLE 2-continued

| Example | 7 | 8 | 9 | 10 | 11 | 12 | 13 |
|---|---|---|---|---|---|---|---|
| glycidyl acrylate | | 25 | 20 | 30 | 30 | 25 | 2.5 |
| hydroquinone | 0.5 | 0.5 | 0.5 | | | | |
| hydroquinone monomethyl ether | | | | 0.5 | 0.5 | 0.5 | 0.5 |
| diluenet:xylene | 80.0 | | | 65 | | | |
| methyl isobutyl ketone | | 45 | 40 | | 65 | 40 | 100 |

TABLE 3

| Example | \multicolumn{13}{c}{Characteristics of macromer solutions} |
|---|---|

| Example | 1 | 2 | 3 | 4 | 5 | 6 | 7 | 8 | 9 | 10 | 11 | 12 | 13 |
|---|---|---|---|---|---|---|---|---|---|---|---|---|---|
| non-volatile % | 50 | 50 | 50 | 50 | 50 | 25 | 25 | 25 | 25 | 25 | 25 | 25 | 25 |
| viscosity: Tohshiba bubble viscometer | J | L-M | R-S | O-P | T-U | $A_4$ | $A_3$ | $A_4$-$A_5$ | A-B | $A_2$ | $A_5$ | $A_3$ | M |
| acid value: mg KOH/g solid | 1.9 | 1.8 | 1.9 | 2.1 | 2.2 | 1.6 | 1.9 | 2.0 | 2.0 | 3.4 | 1.9 | 1.1 | 1.1 |
| Mn: number average molecular weight | 800 | 1600 | 3000 | 1700 | 3200 | 700 | 1000 | 800 | 1000 | 700 | 700 | 1000 | 10000 |
| Mw: weight average molecular weight | 1100 | 2400 | 5000 | 2600 | 5100 | 1000 | 1600 | 1200 | 1600 | 1100 | 1100 | 1500 | 21500 |

The following Examples illustrate the preparation of the present resinous varnishes.

EXAMPLE 14

Into a reaction vessel fitted with stirrer, thermometer, dropping funnel, nitrogen gas inlet pipe and condenser, were placed 80 parts of toluene and 45 parts of butyl acetate and the mixture was heated to 105° C. To this, were dropped in, and at the constant speed, a mixture of 90 parts of methyl methacrylate, 54 parts of 2-hydroxyethyl acrylate, 2 parts of acrylic acid, 30 parts of macromer 1 and 2 parts of azobis-isobutyronitrile from the dropping funnel in 3 hours.

After keeping at 105° C. for 30 minutes, 0.5 part of azobis-isobutyronitrile and 20 parts of butyl acetate were dropped in in 30 minutes and the mixture was further kept at the same temperature for 2 hours. The characteristics of thus obtained varnish are shown in Table 5.

EXAMPLES 15~25

Using the same procedures as stated in Example 14 but with the materials shown in Table 4, various varnishes were prepared. The characteristics of these varnishes are shown in Table 5.

TABLE 4

| Example | 15 | 16 | 17 | 18 | 19 | 20 | 21 | 22 | 23 | 24 | 25 |
|---|---|---|---|---|---|---|---|---|---|---|---|
| styrene | | | 100 | 100 | | | 80 | | 30 | 40 | 40 |
| methyl methacrylate | 90 | 90 | | | 100 | 100 | 80 | | 100 | 80 | 80 |
| butyl methacrylate | | | | | | | | 100 | 50 | | |
| 2-ethylhexyl methacrylate | | | | | | | | 50 | | | |
| lauryl methacrylate | | | 80 | 80 | | | | 50 | | | |
| butyl acrylate | | | | | | | | | | 40 | 40 |
| 2-hydroxyethyl methacrylate | | | | | | | | | | 40 | 40 |
| 2-hydroxyethyl acrylate | 54 | 54 | | | 50 | 50 | | | | | |
| methacrylic acid | | | 1.5 | 1.5 | 1.5 | 1.5 | | | | | |
| acrylic acid | 2 | 2 | | | | | 2.0 | 2.0 | 2.0 | 2.0 | 2.0 |
| macromer No. | 15 | 16 | 17 | 18 | 19 | 20 | 21 | 22 | 23 | 24 | 25 |
| compounding amounts | 30 | 30 | 30 | 30 | 60 | 60 | 60 | 60 | 60 | 10 | 10 |
| solvent: | | | | | | | | | | | |
| xylene | | | 100 | 100 | | | | | | | |
| toluene | 80 | 80 | | | 100 | 100 | 80 | 80 | | 100 | 100 |
| butyl acetate | 45 | 45 | 62 | 62 | 60 | 60 | 32 | 40 | 20 | 50 | 50 |
| butanol | | | | | | | | 32 | 80 | 27 | 27 |
| methyl isobutyl ketone | | | | | | | | | 32 | | |
| azobisisobutyronitrile | 2.0 | 2.0 | 2.0 | 2.0 | 2.0 | 2.0 | 2.0 | 2.0 | 2.0 | 2.0 | 2.0 |
| later charged initiator azobisisobutyronitrile | 0.5 | 0.5 | 0.5 | 0.5 | 0.5 | 0.5 | 0.5 | 0.5 | 0.5 | 0.5 | 0.5 |
| butyl acetate | 20 | 20 | 20 | 20 | 20 | 20 | 20 | 20 | 20 | 20 | 20 |

TABLE 5

| Example | \multicolumn{12}{c}{Characteristics of varnishes} |
|---|---|

| Example | 14 | 15 | 16 | 17 | 18 | 19 | 20 | 21 | 22 | 23 | 24 | 25 |
|---|---|---|---|---|---|---|---|---|---|---|---|---|
| non-volatile content % | 50 | 50 | 50 | 50 | 50 | 50 | 50 | 50 | 50 | 50 | 50 | 50 |
| viscosity: Tohshiba bubble viscometer | $Z_4$ | $Z_5$ | $Z_5$ | $Z_4$ | $Z_5$ | $Z_2$ | $Z_2$ | $Z_3$ | T-U | $Z_5$ | UV | U |
| acid value: mg KOH/g solid | 8.2 | 8.2 | 8.3 | 6.2 | 6.3 | 7.2 | 7.1 | 7.6 | 6.2 | 6.9 | 6.6 | 6.5 |
| Mn: number average molecular weight | 7100 | 7500 | 7200 | 6800 | 6500 | 7100 | 7000 | 7300 | 6600 | 6300 | 5800 | 5900 |
| Mw: weight average molecular weight | 18500 | 20000 | 19400 | 19000 | 18000 | 19200 | 18200 | 20400 | 17200 | 18300 | 15700 | 15300 |

The following are Examples illustrating the preparation of macromer having concentrated basic groups in the branched chain of graft polymer and coating composition containing the same.

EXAMPLE 26

Into a reaction vessel fitted with dropping funnels A and B, condenser, nitrogen gas inlet pipe, thermometer and stirrer, were placed 590 parts of butyl acetate and heated to 120° C. To this, were dropped in at a constant speed 200 parts of dimethylaminoethyl methacrylate from the dropping funnel A and a mixture of 40 parts of 4,4'-azobis(4-cyanovaleric acid), 200 parts of n-butanol and 24 parts of triethylamine from the dropping funnel B, at 120° C. over 3 hours.

After completion of said addition, the mixture was maintained at 120° C. for 30 minutes, added with 37 parts of glycidyl methacrylate and 2.6 parts of hydroquinone and reacted at 120° C. for 60 minutes. A macromer solution (I) was thus obtained. The characteristics of said solution are shown in Table 7.

EXAMPLES 27~32

Using the same procedures as stated in Example 26 but with the materials given in Table 6, various macromer solutions were prepared. The characteristics of these macromer solutions are given in Table 7.

TABLE 6

| Example | 27 | 28 | 29 | 30 | 31 | 32 |
|---|---|---|---|---|---|---|
| macromer | II | III | IV | V | VI | VII |
| methyl methacrylate | 100 | 20 | 80 | 50 | | 100 |
| styrene | | 20 | | | | |
| butyl acrylate | | 20 | | | | |
| butyl methacrylate | | 20 | | | | |
| 2-hydroxyethyl acrylate | | | 20 | | | |
| 2-hydroxyethyl methacrylate | | 20 | | | | |
| dimethylaminoethyl methacrylate | 100 | | 50 | | 100 | 50 |
| diethylaminoethyl methacrylate | | 100 | | | | |
| dimethylaminomethyl acrylate | | | | 50 | | |
| diethylaminoethyl acrylate | | | | | 100 | |
| 2-vinyl pyridine | | | | 150 | | 50 |

TABLE 7

| | Characteristics of macromer solutions | | | | | | |
|---|---|---|---|---|---|---|---|
| macromer No. | I | II | III | IV | V | VI | VII |
| non-volatile content % | 25.0 | 25.0 | 25.0 | 25.0 | 25.0 | 25.0 | 25.0 |
| viscosity: Tohshiba bubble viscometer | $A_5$ | $A_5$ | $A_4A_5$ | $A_5$ | $A_5$ | $A_4$ | $A_5$ |
| acid value: mg KOH/g solid | 1.1 | 0.9 | 1.1 | 1.1 | 0.9 | 0.8 | 0.6 |
| Mn: number average molecular weight | 750 | 740 | 700 | 750 | 780 | 810 | 740 |
| Mw: weight average molecular weight | 1090 | 1070 | 1020 | 1090 | 1130 | 1170 | 1070 |

EXAMPLE 33

Into a reaction vessel fitted with stirrer, condenser, nitrogen gas inlet pipe, and dropping funnel, were placed 35 parts of toluene and 10 parts of n-butanol, and the mixture was heated to 105° C. To this, were added dropwise and at a constant speed 50 parts of methyl methacrylate, 30.0 parts of n-butyl acrylate, 46 parts of n-butyl methacrylate, 14.0 parts of 2-hydroxyethyl methacrylate, 1.4 parts of acrylic acid, 10 parts of macromer solution obtained in Example 26 and 2 parts of azobis-isobutyronitrile, at 105° C. over 3 hours.

After elapsing 30 minutes from the completion of said addition, 0.2 part of tertiary butyl peroxy 2-ethylhexanoate and 5 parts of toluene were added to the reactor and the mixture was kept standing for 2 hrs. 45 Parts of toluene were added to the reaction product and the mixture was allowed to cool to obtain a resinous varnish (1) having a nonvolatile content 50%, viscosity (Tohshiba bubble viscometer) Y-Z, acid value 11.0 (mg KOH/g solid), number average molecular weight Mn 7800 and weight average molecular weight Mw 29000.

EXAMPLES 34~40

Using the same procedures as stated in Example 33 but with the materials shown in Table 8, various resinous varnishes were prepared. The characteristics of these varnishes are shown in Table 8.

COMPARATIVE EXAMPLE 1

Repeating the procedures of Example 33 but substituting 2.5 parts of dimethylaminoethyl methacrylate for 10 parts of macromer solution obtained in Example 26 and limiting the quantity of azobis-isobutyro nitrile to 1.8 parts, a resinous varnish A was obtained.

COMPARATIVE EXAMPLES 2~10

Various comparative varnishes were prepared by using the same method of Example 26 with the materials shown in Table. The characteristics of these varnishes are shown in Table 9.

TABLE 8

| Example | 34 | 35 | 36 | 37 | 38 | 39 | 40 |
|---|---|---|---|---|---|---|---|
| varnish No. | 2 | 3 | 4 | 5 | 6 | 7 | 8 |
| styrene | 20 | 20 | 20 | 20 | 20 | 20 | 20 |
| methyl methacrylate | 5 | 5 | 5 | 5 | 5 | 5 | 5 |
| n-butyl acrylate | 12 | 12 | 12 | 12 | 12 | 12 | 12 |
| n-butyl methacrylate | 47 | 47 | 47 | 47 | 47 | 47 | 47 |
| 2-hydroxyethyl methacrylate | 14 | 14 | 14 | 14 | 14 | 14 | 14 |
| acrylic acid | | 1.4 | 1.4 | 1.4 | 1.4 | 1.4 | 1.4 |
| methacrylic acid | 2 | | | | | | |
| macromer | | | | | | | |
| I | 8 | | | | | | |
| II | | 10 | | | | | |
| III | | | 10 | | | | |
| IV | | | | 10 | | | |
| V | | | | | 10 | | |

TABLE 8-continued

| Example | 34 | 35 | 36 | 37 | 38 | 39 | 40 |
|---|---|---|---|---|---|---|---|
| VI | | | | | | 10 | |
| VII | | | | | | | 10 |
| non-volatile content % | 50.2 | 50.0 | 50.0 | 50.1 | 50.1 | 50.0 | 50.0 |
| viscosity (Tohshiba bubble viscometer) | Y | U | U-V | V | T-U | U | UV |
| acid value | 13.1 | 10.9 | 11.1 | 11.0 | 10.8 | 10.9 | 10.9 |
| Mn | 8000 | 7500 | 7700 | 7800 | 7600 | 8200 | 8000 |
| Mw | 24800 | 23300 | 23900 | 24100 | 23600 | 25400 | 25000 |

TABLE 9

| Comp. Example | 1 | 2 | 3 | 4 | 5 | 6 | 7 | 8 | 9 | 10 |
|---|---|---|---|---|---|---|---|---|---|---|
| varnish No. | A | B | C | D | E | F | G | H | I | J |
| styrene | | | 20 | 20 | 20 | 20.25 | 20.0 | 20.0 | 20.0 | 20.0 |
| methyl methacrylate | 50.0 | 50.0 | 5.0 | 5.0 | 6.3 | 5.25 | 6.0 | 5.6 | 5.0 | 6.25 |
| n-butyl acrylate | 30.0 | 30.0 | 12.0 | 12.0 | 12.0 | 12.25 | 12.0 | 12.0 | 12.0 | 12.0 |
| n-butyl methacrylate | 4.6 | 4.6 | 47.0 | 47.0 | 47.0 | 47.25 | 47.0 | 47.0 | 47.0 | 47.0 |
| 2-hydroxyethyl methacrylate | 14.0 | 14.0 | 14.0 | 14.0 | 14.0 | 14.25 | 14.25 | 14.0 | 14.0 | 14.0 |
| acrylic acid | 1.4 | 1.4 | | | 1.4 | 1.4 | 1.4 | 1.4 | 1.4 | 1.4 |
| methacrylic acid | | | 2.0 | 2.0 | | | | | | |
| dimethylaminoethyl methacrylate | 2.5 | | 2.0 | | 1.3 | | 0.63 | | 1.25 | 0.63 |
| diethylaminoethyl methacrylate | | | | | | 1.25 | | | | |
| dimethylaminomethyl acrylate | | | | | | | 0.63 | | | |
| diethylaminoethyl acrylate | | | | | | | | | 1.25 | |
| 2-vinylpyridine | | | | | | | | 1.88 | | 0.63 |
| azobis-isobutyronitrile | 1.8 | 1.5 | 1.8 | 1.5 | 1.8 | 1.8 | 1.8 | 1.8 | 1.8 | 1.8 |
| non-volatile content % | 52.0 | 51.0 | 52.0 | 51.0 | 52.0 | 52.1 | 52.1 | 52.0 | 52.0 | 52.0 |
| viscosity (Toshiba bubble viscometer) | Y-Z | Z | Y | Y | U | U-V | V | T-U | U | UV |
| acid value | 10.8 | 10.8 | 13.1 | 13.1 | 10.8 | 10.8 | 10.7 | 10.8 | 10.8 | 10.7 |
| Mn | 8100 | 8500 | 8000 | 8700 | 8100 | 8200 | 8100 | 8000 | 8200 | 8000 |
| Mw | 22000 | 27000 | 23000 | 29000 | 25000 | 21000 | 22000 | 23000 | 22000 | 21000 |

The following Examples show the present coating compositions.

EXAMPLE 41

Using the grafted acrylic resinous solution (1) obtained in Example 33 and following the undermentioned dispersion formulation, a black colored dispersion paste were prepared according to normal dispersion procedures, and then following the undermentioned solution formulation a black primary colored coating composition was prepared.

TABLE A

| (Dispersion formulation) | |
|---|---|
| carbon black (Note 1) | 3.3 parts |
| grafted acrylic resinous solution (1) | 15.6 |
| xylene | 15.1 |
| | 34.0 |
| (Solution formulation) | |
| black colored dispersion paste | 34.0 |
| grafted acrylic resinous solution (1) | 102.0 |
| melamine resin (Note 2) | 28.0 |
| xylene | 8.6 |
| butanol | 4.7 |

TABLE A-continued

| | 177.3 |
|---|---|

Note 1: Neospectra AG beads, manufactured by Colombia Industries.
Note 2: U-ban 20 SE-60, manufactured by Mitsui Tohatsu K.K.

Thus obtained black primary colored coating composition was applied onto a glass plate by flow-coating, and baked by using a hot air drier at 140° C. for 30 minutes. 20° Mirror gloss of the coating was determined by using Murakami type GM-3H glossmeter and pigment dispersibility of the composition was evaluated therefrom. The test result is shown in Table 10.

Jetness was evaluated from Y value obtained in the reflectance measurement at visibile wavelength region (400~700 nm) using a spectrophotometer (Automatic clor eye KCS-18, manufactured by McBeth Co.), the result being shown in Table 10.

In order to evaluate dispersion stability of the thus obtained paste, the composition was maintained at 40° C. for one month and viscosity was measured and viscosity increasing rate was calculated from viscosity after 1 month storage at 40° C. (cps)/initial viscosity (cps). The test result is shown in Table 10.

EXAMPLE 42

Red primary colored coating composition was prepared by using grafted acrylic resinous solution (2) obtained in Example 27, in the dispersion formulation as well as the solution formulation hereinunder stated.

TABLE B

| (Dispersion formulation) | |
|---|---|
| Cinquacia Red-Y (Note 3) | 18.0 parts |
| grafted acrylic resinous solution (2) | 52.0 |
| xylene | 30.0 |
| | 100.0 |
| (Solution formulation) | |
| red colored dispersion paste | 100.0 |
| grafted acrylic resinous solution (2) | 38.0 |
| melamine resin | 24.0 |
| n-butanol | 5.0 |
| | 167.0 |

Note 3: Cinquacia Red RT-759D, manufactured by Du Pont.

The red primary colored coating composition was then applied onto a glass plate by flow-coating and 20° mirror gloss was determined as in Example 41. Dispersion stability of the paste was also examined. The test results are shown in Table 10, respectively.

EXAMPLES 43~45

Black primary colored coating compositions were prepared as in Example 41, but substituting grafted acrylic resinous solutions (3), (4) and (5) for the resinous solution (1), respectively. The same tests as stated in Example 41 were conducted and the tests results are shown in Table 10.

EXAMPLES 46~48

Red primary colored coating compositions were prepared as in Example 42, but substituting the grafted acrylic resinous solutions (6), (7) and (8) for the solution (2). The same tests were conducted and the test results are shown in Table 11.

COMPARATIVE EXAMPLE 11

Black primary colored coating compositions were prepared according to the procedures of Example 41 but substituting grafted acrylic resinous solutions A and B for the resinous solution (1). These compositions were evaluated in the same way and the results are shown in Table 10.

COMPARATIVE EXAMPLE 12

Red primary colored coating compositions were prepared according to the procedures of Example 42 but substituting grafted acrylic resinous solutions C and D for the resinous solution (2). These compositions were evaluated in the same way and the results are shown in Table 11.

COMPARATIVE EXAMPLES 13~15

Black primary colored coating compositions were prepared according to the procedures of Example 41 but substituting grafted acrylic resinous solutions E,F and G for the resinous solution (1). These compositions were evaluated in the same way and the results are shown in Table 10.

COMPARATIVE EXAMPLES 16~18

Red primary colored coating compositions were prepared according to the procedures of Example 42 but substituting grafted acrylic resinous solutions H,I and J for the resinous solution (2). These compositions were evaluated in the same way and the results are shown in Table 11. In the following Tables, Jetness and storage stability each was evaluated with the undermentioned standards:

| | Y value |
|---|---|
| | Jetness |
| ⊙ | less than 0.12 |
| ○ | 0.12 up to 0.14 |
| △ | 0.14 up to 0.18 |
| X | more than 0.18 |
| | Storage stability |
| | (viscosity (cps) after 1 month at 40° C./initial viscosity (cps)) |
| ⊙ | less than 1.2 |
| ○ | 1.2 up to 1.5 |
| △ | 1.5 up to 2.2 |
| X | more than 2.2 |

TABLE 10

(black colored)

| | Example 41 | Comp. Ex. 11 | Comp. Ex. 11 | Example 43 | Comp. Ex. 13 | Example 44 | Comp. Ex. 14 | Example 45 | Comp. Ex. 15 |
|---|---|---|---|---|---|---|---|---|---|
| Varnish No. | 1 | A | B | 3 | E | 4 | F | 5 | G |
| 20° G | 95 | 83 | 27 | 93 | 81 | 92 | 83 | 96 | 81 |
| jetness | ⊙ | △ | X | ⊙ | △ | ○ | △ | ⊙ | △ |
| paste storage stability | ⊙ | △ | X | ○ | △ | ○ | △ | ○ | △ |

TABLE 11

(red colored)

| | Example 42 | Comp. Ex. 12 | Comp. Ex. 12 | Example 46 | Comp. Ex. 16 | Example 47 | Comp. Ex. 17 | Example 48 | Comp. Ex. 18 |
|---|---|---|---|---|---|---|---|---|---|
| Varnish No. | 2 | C | D | 6 | H | 7 | I | 8 | J |
| 20° G | 88 | 63 | 33 | 89 | 59 | 90 | 60 | 87 | 63 |
| paste storage stability | ⊙ | △ | X | ○ | △ | ⊙ | △ | ○ | △ |

What is claimed is:

1. A resinous composition of an acrylic graft copolymer having backbone chain and basic grafted chains obtained by the process which comprises polymerizing at least one α,β-ethylenically unsaturated monomer having no oxirane and carboxyl groups, at least 30% of said monomers being basic monomers selected from the group consisting of amino acrylates or methacrylates and vinyl pyridines, in an organic solvent in the absence of a chain transfer agent and in the presence of solubilized azo initiator having carboxyl group and a tertiary amine, to obtain an end carboxyl bearing basic acrylic oligomer, reacting the thus obtained oligomer with a compound having one $\alpha,\beta$-ethylenically unsaturated bonding and an oxirane ring to obtain a reactive basic acrylic oligomer, and copolymerizing the same with at least one $\alpha,\beta$-ethylenically unsaturated monomer which will constitute the backbone chain, through radical polymerization.

2. A coating composition comprising a resinous composition of claim 1 in an amount of at least 5% of the resinous components of the resinous vehicle of the coating composition.

3. A method for preparing a resinous composition of an acrylic graft copolymer having backbone chain and basic graft chains, at least 30% of the constituting monomers of said basic graft chain being basic monomers, which comprises polymerizing at least one $\alpha,\beta$-ethylenically unsaturated monomer having no oxirane and carboxyl groups, at least 30% of said monomers being basic monomers selected from the group consisting of amino acrylates or methacrylates and vinyl pyridines, in an organic solvent in the absence of a chain transfer agent and in the presence of solubilized azo initiator having carboxyl group and a tertiary amine, to obtain an end carboxyl bearing basic acrylic oligomer, reacting the thus obtained oligomer with a compound having one $\alpha,\beta$-ethylenically unsaturated bonding and an oxirane ring to obtain a reactive basic acrylic oligomer, and copolymerizing the same with at least one $\alpha,\beta$-ethylenically unsaturated monomer which will constitute the backbone chain, through radical polymerization.

* * * * *